Patented Dec. 25, 1923.

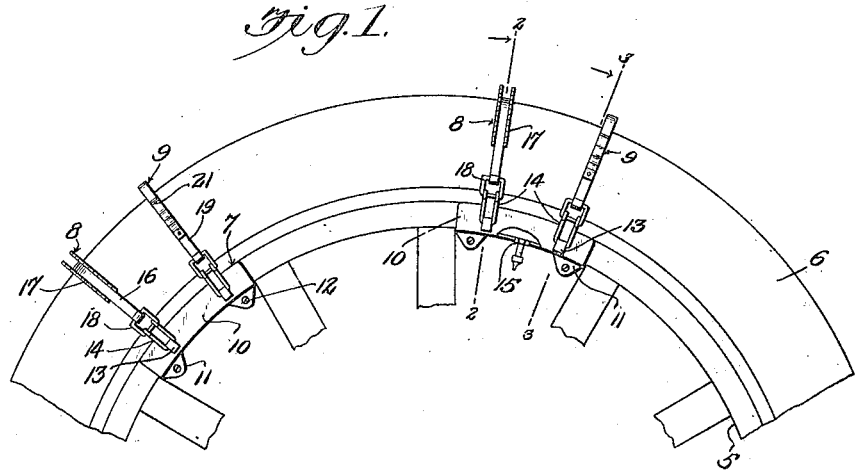
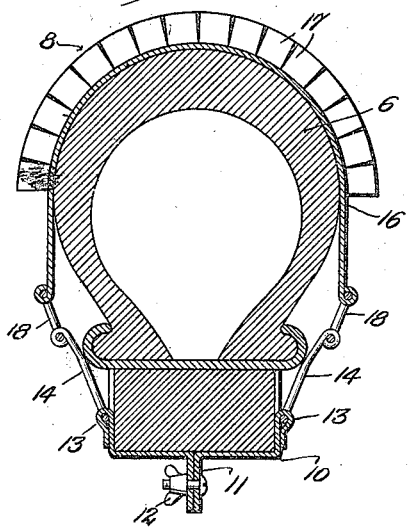
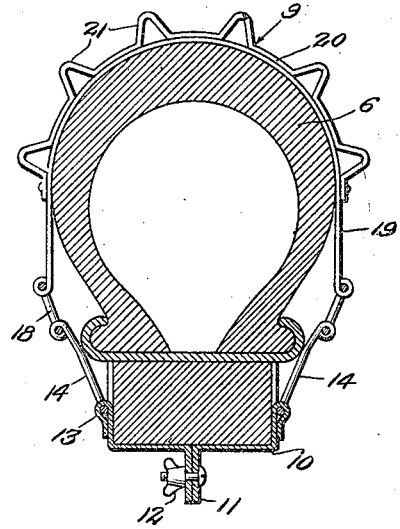
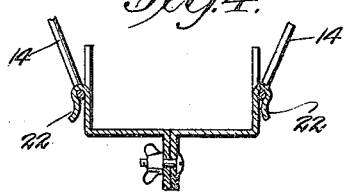

1,478,613

UNITED STATES PATENT OFFICE.

ALBERT N. MENZER AND FREDERICK MINTMIER, OF JOHNSTOWN, PENNSYLVANIA.

ANTISLIPPING ATTACHMENT FOR MOTOR-VEHICLE TIRES.

Application filed February 21, 1923. Serial No. 620,399.

*To all whom it may concern:*

Be it known that we, ALBERT N. MENZER and FREDERICK MINTMIER, citizens of the United States, residing at Johnstown, in the county of Cambria and State of Pennsylvania, have invented certain new and useful Improvements in Antislipping Attachments for Motor-Vehicle Tires, of which the following is a specification.

The present invention relates to anti-slipping attachments for motor vehicle tires.

An object of the invention is to provide an attachment which positively insures traction of vehicle wheels even on road surfaces which may be covered with ice, mud, snow or other elements having a tendency to cause slippage of the wheels especially when pneumatic tires are employed, thereby permitting the vehicle to be positively driven in a direct course at all times without danger to the occupants and without loss of traction.

A co-ordinate object of the invention is to provide anti-slipping tire attachments which are made in units each of which includes an element to positively prevent circumferential slippage of the tire and an element to prevent lateral slippage of the tire, the units being entirely independent so that the incapacitation of one will not interfere with or in any way nullify the effectiveness of the other units.

Other objects of the invention will be apparent from the following description of the present preferred form of the invention taken in connection with the accompanying drawings wherein:—

Fig. 1 is a fragmentary side elevational view of a vehicle wheel embodying anti-slipping attachments made in accordance with this invention;

Fig. 2 is a sectional view taken on the line 2—2 of Fig. 1 looking in the direction of the arrow;

Fig. 3 is a sectional view taken on the line 3—3 of Fig. 1 looking in the direction of the arrow; and Fig. 4 is a fragmentary sectional view of an anti-slipping unit showing a slightly modified form of felly engaging member.

In the drawings in order to illustrate the application of this invention a portion of a vehicle wheel 5 of standard construction is shown upon which a portion of a pneumatic tire, likewise of standard construction, is mounted. The present invention consists of a series of units each of which is generally designated 7, the felly engaging portions of which may be arranged to lie between the spokes of the wheel, as shown in Fig. 1. The road engaging portions of each unit consists of an element generally designated 8 to prevent circumferential slippage of the wheel and an element generally designated 9 which prevents lateral slippage of the wheel.

Each of the units constituting the present invention is composed specifically of wheel felly engaging members 10 formed from a pair of complemental plates the inner marginal edges of which are equipped with marginal extensions bent inwardly at right angles to provide lugs 11 which are held in engagement by means 12 in the present instance comprising bolts and thumb nuts. The outer marginal edges of the plates 10 are incised at intervals and the portion between each pair of incisions folded over to provide ears 13 with which links 14 are pivotally engaged. If desired one of the units of each wheel may have a portion removed from the felly engaging plates thereof to provide an opening 15 through which the tire valve may be conveniently engaged. Moreover, in the case of disk wheels, the lugs 11 may impinge the opposite faces of the disk and the bolts of the means 12 passed through complemental openings in the disks. The outer marginal edge of each plate 10 may fit snugly against the inner periphery of the tire rim as shown in Figs. 2 and 3.

The element 8 of each unit which is used to prevent circumferential slippage of the tire and correspondingly to insure constant traction of the latter, is formed from a metal strap 16 the lateral margins of which are transversely incised in order to provide series of lugs 17 which are bent outwardly at right angles for engagement with the road surface. The terminals of the strap carry loops 18 which are pivotally connected with the outer ends of the links 14.

The element 9 of each unit which is especially adapted to prevent lateral slippage of the tire consists of a metal strap 19 embracing the tire 6 and having the opposite ends thereof connected to the felly engaging plates of the unit in the same manner in which the metal straps 16 are connected to said plates. An irregular road surface engaging member is superimposed on the strap 19 and consists of a strap 20 at the ends of which are riveted to the strap 19 remote from the terminals of the latter, while intermediate portions thereof are pressed outwardly to provide ribs 21 which in the present instance are shown to be substantially V-shaped and arranged to extend transversely across the strap 19.

The links 14 may be either fixedly connected to the felly engaging plates, as shown in Figs. 1 and 2 or may be detachably connected thereto, as shown in Fig. 4. In the latter instance the free terminals of the ears are bent outwardly, as indicated at 22, in order to provide a flaring mouth through which the links 14 may be engaged with facility. It is of course understood that the ears 22 are made of a resilient metal so that the links 14 will not be accidentally disengaged therefrom although exertion of pressure on the links, will cause the ears 22 to be flexed outwardly to permit disengagement of the links when desired.

It is well known in the art to provide anti-slipping attachments for vehicle wheels which prevent both circumferential and lateral slippage, but it is the purport of this invention to provide independent units each of which embodies this combination so that the incapacitation of one unit will in no way void or minimize the effectiveness of the other units. Moreover, each unit may be quickly and conveniently engaged with the wheel without the necessity of moving the vehicle.

Various changes may be made in this device especially in the details of construction, materials used, proportion and arrangement of parts within the scope of the claims hereto appended.

What is claimed is:—

1. An anti-slipping attachment for the tires of motor vehicles including units for engagement with a tire, each unit including detachable felly embracing members and road impinging elements, one of said elements comprising a strap the ends of which are in connection with said members and the margins thereof transversely incised to provide lugs, said lugs being bent outwardly at right angles.

2. An anti-slipping attachment for tires of motor vehicles including units for engagement with a tire, each unit including detachable felly embracing members and road impinging elements, one of said elements comprising a strap the ends of which are in connection with said members, and a road surface engaging strap mounted upon the first said strap and formed to provide projections, said road surface engaging strap being superimposed on the first said strap.

3. An anti-slipping attachment for the tires of motor vehicles including felly engaging plates the inner margins of which have portions extended therefrom and bent inwardly at right angles to provide lugs, means detachably connecting said lugs together, the outer margins of said plates being incised and the portions of the plates between the incisions turned over to provide ears, and road surface engaging members connected to said ears.

ALBERT $\overset{\text{his}}{\underset{\text{mark}}{\times}}$ N. MENZER.

FREDERICK MINTMIER.

Witness:
GOLDIE I. NOON.